Dec. 19, 1933. C. E. WANEMAKER 1,939,742
QUICK CHANGE BATTERY CONTAINER AND CLAMP
Filed June 14, 1930
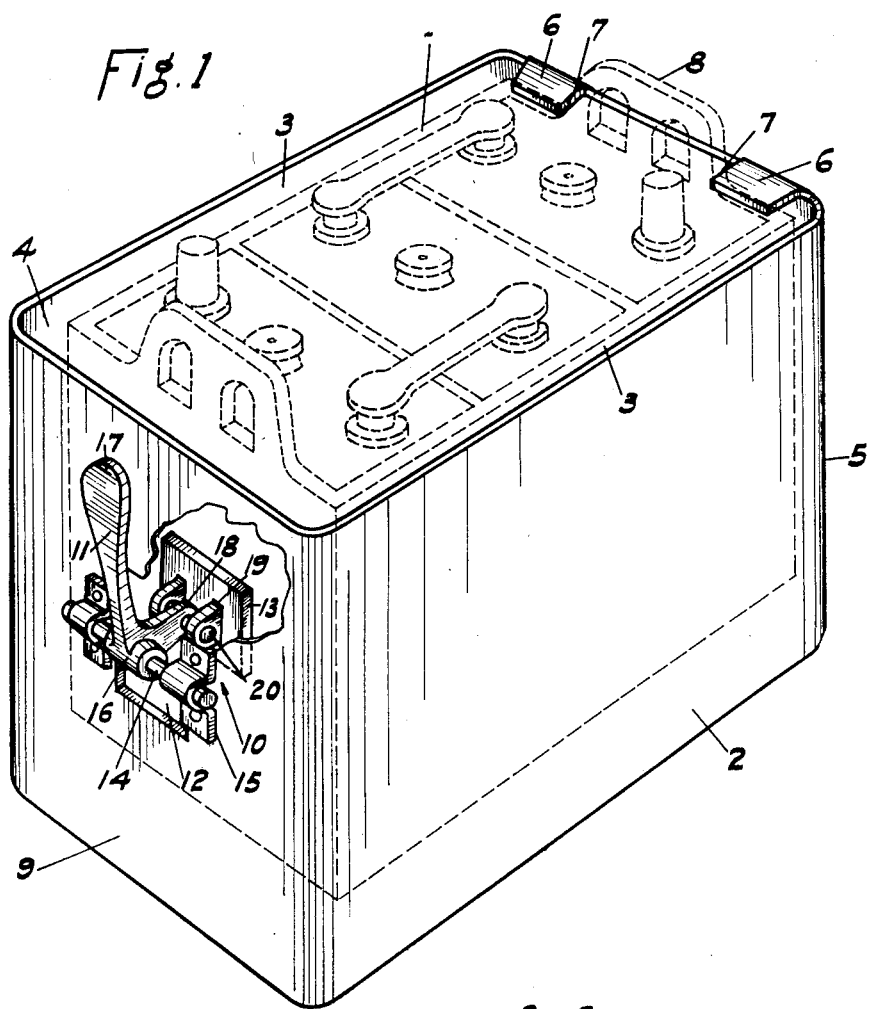
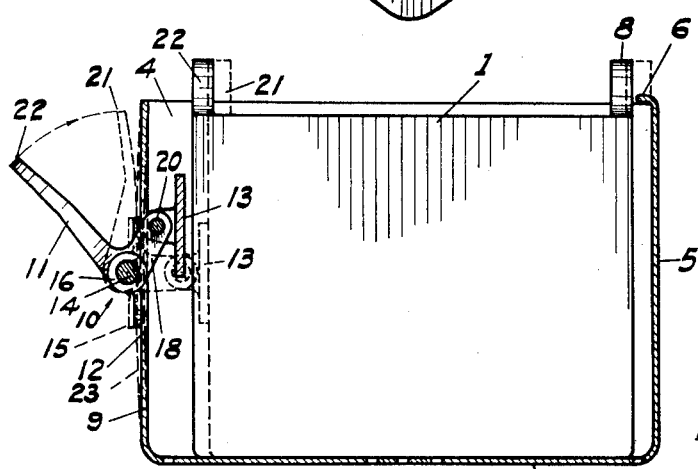
INVENTOR.
Clyde E. Wanemaker
BY R. L. Barton
ATTORNEY Patented Dec. 19, 1933

1,939,742

UNITED STATES PATENT OFFICE 1,939,742

QUICK CHANGE BATTERY CONTAINER AND CLAMP

Clyde E. Wanemaker, San Diego, Calif.

Application June 14, 1930. Serial No. 461,217

2 Claims. (Cl. 136—171)

My invention relates to improvements in battery containers and particularly to a combined storage battery container and clamp.

An important object of the invention is to provide a container which may serve as a protector for the battery casing and at the same time have incorporated therewith an improved manually operable locking and releasing means so that a quick exchange in batteries can be made.

It is a further object of the invention to utilize the locking means for the purpose of preventing the binding posts of the battery from being subject to continual strain as is now the case, through vibration and jostling of the battery in its saddle support, thus tending to break down and destroy the battery cells, thereby shortening the life and use of the battery and subjecting the owner to unnecessary costs and repairs.

It is a still further object of the invention to provide a device which is simple and cheap to manufacture and possessing features which will contribute to the preservation and longevity of the battery and facilitate the work of handling, or changing and installing batteries in battery shops specializing in that class of work.

Further advantageous features will no doubt hereinafter appear.

My invention will be more readily understood by reference to the accompanying drawing forming part of this specification in which:

Fig. 1 is perspective view of my improved invention, illustrating its adaptation and application to an ordinary storage battery.

Fig. 2 is a longitudinal mid-sectional view taken thru the device showing the battery shifted in locked position in the container in dotted lines and in removable position in full lines.

In the drawing, the numeral 1 indicates the storage battery and 2 the container for the battery.

The battery and its container are shown apart from any conveyance, public carrier or contrivance wherein the use of battery is necessary to their proper functioning, it only being considered an essential part of this invention to provide a receptacle for the battery and a means whereby a quick exchanging may be had; and the manner in which the container is held rigid or integralized with any other functioning part, frame or member is not therefore considered per se a part of the present invention.

The container 2 is an open-topped receptacle having a perforated bottom and preferably parallel side and end pieces. The container shown is a pressing or die casting although it may be built up from structural shapes consisting of angles and plates if desired.

At either side 3 is shown a slight clearance whereby the battery 2 may be easily shifted in the container, elevated therefrom or inserted therewithin.

There is a greater clearance provided at the end 4 the reason for which will be explained later.

At one end of the container, which is designated by the numeral 5 is provided a pair of spaced keepers, desirably flanges or ears 6 disposed inwardly from the top edge of the end piece forming that side. They are adapted to overlie the battery 1 when in locking position and prevent the battery from forward movement in the container.

Said keepers are also adapted to engage the side portions 7 of the handle 8 of the battery whereby to prevent lateral movement in the container.

Means to prevent endwise or any shifting movement of the battery in the container will now be described.

On the end of the container designated by the numeral 9 is mounted a clamping device 10, said device being manually operable. The operating toggle lever 11 is mounted on the outside, there being also a portion of which extends through a slot 12 where it in turn pivotally connects with a clamping plate 13 on the inside of the container.

The operating toggle lever 11 has a pivotal axis of support 14, said axis being journalled in bearings 15 placed at either side of the slot 12. At the pivotal axis 14 is a pin construction which is removable. The bearings 15 may be desirably spot or tack welded to the container when the material permits or they may be attached by rivets or bolts.

The toggle lever 11 is substantially L shaped, there being provided a hub portion 16 through which the pivotal axis extends and a leg 17 whose flat face lies in a plane with the end piece 9 against which it substantially abuts when in closed position and away from which the battery is shifted when in the locked position.

The other leg 18 of the L has its flat face extending perpendicular to the face of the leg 17, this portion extending through the slot 12 in the container.

Pivotally mounted upon the end portion of the leg 18 is the aforementioned clamping plate 13 which is manually pressed against the end of the battery against which it abuts. The clamping plate is provided with sufficient bearing surface to insure that when it is pressed tightly against the end of the battery it will prevent any shifting or jostling of the battery in the container.

There is cast integral with the plate 13 a pair of ears 19 and journaled in said ears is a pin 20, said pin comprising means for mounting said plate to aforesaid leg 18.

There is a space 4 between the end of the battery and the container to permit the battery to be shifted sufficiently to clear the inwardly directed flanges 6 on the end 5 of the container when it is inserted or withdrawn from the container.

The space 4 also provides enough play in which to swing the clamping plate 13 from locking position 21 to unlocking position 22 as shown in dotted and full lines of both the battery and the toggle lever in Fig. 2, and at the same time allows ample freedom for the battery as it is being withdrawn or inserted in the container.

It is further provided that the length between the centers of the axis 14 and 20 plus the distance between the axis of the pin 20 and the face of the battery when the clamping plate 13 is pressed tightly thereagainst be appreciably greater than the distance between the end of the battery and the inside of the inner face of the container plus the distance from the inside of the container just mentioned to the center of the pivotal axis 14.

By virtue of the greater distance at the maximum locking position as shown in the dotted lines in Fig. 2 the end piece 9 will be slightly bulged when the toggle is moved over dead center. The slight bulging is shown in dotted lines in Fig. 2 and it is also indicated by the numeral 23. As a consequence, the clamping plate will always insure permanent locking of the battery while the toggle is in the latter position.

The substance of which the container is made may be of a gage which will permit of the slight flexing as shown.

I claim:—

1. A battery box holding device comprising a sheet metal container having a pair of spaced keepers inwardly directed from the top edge of one of the walls thereof so as to overlie a battery and at the same time engage the side portions of the handle thereof, there being an opening in the wall of said container opposite said keepers, bearings disposed adjacent said opening, a rockable lever including a hub and a shaft extending through said hub journalled in said bearings, said lever having a handle which is manually accessible exteriorly of said container, and an arm depending from said handle and extending laterally through said opening, and a clamping plate swingably mounted to said arm at a point adjacent to its pivotal mounting, said clamping plate being adapted to be swung to and from a locking position thru the medium of said handle when said arm which is pivoted to said plate is moved across dead center, said clamping plate engaging an end of said battery box to shift it in clamping position with the opposite end of said container and cooperating with said keepers to maintain a locking engagement of said battery box in said container.

2. An article container comprising a substantially rectangular open top casing of somewhat resilient sheet metal, spaced keepers directed inwardly from the wall of said container at one side of the top opening thereof, there being an opening through the wall of said container which is opposite to said keepers, a clamping device pivotally mounted to said container adjacent said opening comprising an L-shaped lever, one arm of which extends laterally through said opening and is provided with a clamping plate rockably connected thereto at a point adjacent to the pivotal mounting of said lever, the other arm of said lever providing a handle and being accessible exteriorly of said container and manually operable to move the arm which is pivoted to said clamping plate to and from a locking position across dead center to maintain, in conjunction with said keepers, an article in a locked clamping position against the opposite wall of said container.

CLYDE E. WANEMAKER.